(12) United States Patent
Wei et al.

(10) Patent No.: US 9,131,213 B2
(45) Date of Patent: Sep. 8, 2015

(54) METHOD OF GENERATING A BLOCKINESS INDICATOR FOR A VIDEO SIGNAL

(75) Inventors: Jeff Wei, Richmond Hill (CA); Rakesh Patel, Mississauga (CA)

(73) Assignee: Evertz Microsystems Ltd., Burlington (CA)

( * ) Notice: Subject to any disclaimer, the term of this patent is extended or adjusted under 35 U.S.C. 154(b) by 1136 days.

(21) Appl. No.: 12/203,433

(22) Filed: Sep. 3, 2008

(65) Prior Publication Data

US 2009/0067511 A1    Mar. 12, 2009

Related U.S. Application Data

(60) Provisional application No. 60/970,659, filed on Sep. 7, 2007.

(51) Int. Cl.
| | |
|---|---|
| *H04N 7/26* | (2006.01) |
| *H04N 17/00* | (2006.01) |
| *H04N 19/86* | (2014.01) |
| *H04N 19/17* | (2014.01) |
| *H04N 19/82* | (2014.01) |

(52) U.S. Cl.
CPC ............. *H04N 17/004* (2013.01); *H04N 19/17* (2014.11); *H04N 19/82* (2014.11); *H04N 19/86* (2014.11)

(58) Field of Classification Search
CPC ..... H04N 1/4092; H04N 1/415; H04N 5/142; H04N 5/91; H04N 5/917; H04N 7/06; H04N 7/063; H04N 7/122; H04N 17/004; H04N 19/119; H04N 19/154; H04N 19/17; H04N 19/172; H04N 19/174; H04N 19/176; H04N 19/182; H04N 19/80; H04N 19/86; H04N 19/865; H04N 21/454; H04N 21/4545

USPC ........... 375/240.27, 240.29, E7.176, E7.178, 375/E7.2; 348/184, 252, 425.2, 625; 358/3.15, 3.27; 370/521; 382/194, 268

See application file for complete search history.

(56) References Cited

U.S. PATENT DOCUMENTS

| | | | | |
|---|---|---|---|---|
| 5,654,759 | A * | 8/1997 | Augenbraun et al. | ... 375/240.03 |
| 5,793,985 | A * | 8/1998 | Natarajan et al. | ............ 709/247 |
| 6,320,905 | B1 * | 11/2001 | Konstantinides | ........ 375/240.08 |
| 6,437,821 | B1 * | 8/2002 | Janko et al. | .................... 348/180 |
| 6,873,436 | B1 * | 3/2005 | Terada et al. | .................... 358/1.9 |
| 7,003,174 | B2 * | 2/2006 | Kryukov et al. | ............... 382/266 |
| 7,016,415 | B2 * | 3/2006 | Alvarez | .................... 375/240.16 |
| 7,075,993 | B2 * | 7/2006 | O'Brien, Jr. | ............. 375/240.27 |
| 7,099,518 | B2 * | 8/2006 | Li et al. | ......................... 382/255 |
| 7,346,226 | B2 * | 3/2008 | Shyshkin | ..................... 382/275 |

(Continued)

*Primary Examiner* — Alpus H Hsu
(74) *Attorney, Agent, or Firm* — Bereskin & Parr LLP/S.E.N.C.R.L.,s.r.l

(57) ABSTRACT

The described embodiments relate to methods and systems for detecting the blockiness of a video signal comprised of a number of pixels. The method includes the steps of calculating a total number of pixels in the video signal in flat blocks and visible block edge transitions, and generating a blockiness indicator from the total number of pixels in flat blocks and visible block edge transitions. The step of calculating the total number of pixels in flat blocks and the total number of pixels in visible block edge transitions may include calculating differential values for each pixel in the video signal, analyzing the differential values to determine if the pixel is part of a transition and/or a flat area and then counting the number of pixels in flat blocks and visible block edge transitions to produce a total number of pixels in flat blocks and a total number of pixels in visible block edge transitions.

23 Claims, 5 Drawing Sheets

(56) References Cited

U.S. PATENT DOCUMENTS

| | | | |
|---|---|---|---|
| 7,574,060 B2 * | 8/2009 | Gambhire | 382/233 |
| 7,683,948 B2 * | 3/2010 | Yanof et al. | 348/246 |
| 7,742,521 B2 * | 6/2010 | Vitali et al. | 375/240.03 |
| 8,023,563 B2 * | 9/2011 | Vella et al. | 375/240.22 |
| 8,194,757 B2 * | 6/2012 | Schoner | 375/240.27 |
| 8,254,462 B2 * | 8/2012 | Schoner | 375/240.24 |
| 8,422,546 B2 * | 4/2013 | Lin et al. | 375/240 |
| 2005/0135701 A1 * | 6/2005 | Atkins | 382/274 |
| 2007/0071095 A1 * | 3/2007 | Lim | 375/240.08 |
| 2007/0263905 A1 * | 11/2007 | Chang et al. | 382/107 |
| 2007/0285729 A1 * | 12/2007 | Wada | 358/3.15 |
| 2008/0037627 A1 * | 2/2008 | Tang et al. | 375/240.02 |
| 2008/0123989 A1 * | 5/2008 | Lin et al. | 382/275 |
| 2008/0205786 A1 * | 8/2008 | Young et al. | 382/261 |
| 2009/0046202 A1 * | 2/2009 | Huang et al. | 348/441 |

* cited by examiner

METHOD OF GENERATING A BLOCKINESS INDICATOR FOR A VIDEO SIGNAL

This is an application claiming the benefit under 35 USC 119(e) of U.S. Provisional Patent Application Ser. No. 60/970,659 filed Sep. 7, 2007. U.S. Ser. No. 60/970,659 is incorporated herein, in its entirety, by this reference to it.

TECHNICAL FIELD

The described embodiments relate to methods and systems for detecting the blockiness of a video signal.

BACKGROUND

Video compression is the process of taking a video signal and compressing it so that it will take up less bandwidth when it is transmitted or less space when it is stored. Many video compression standards have been developed and include H.262, H.263, MPEG-1, MPEG-2, and MPEG-4. Many of these standards separate video into blocks of data and separately compress each block using a Discrete Cosine Transform (DCT). One problem with these compression algorithms, however, is that video that undergoes such compression may be subject to "blockiness", meaning that the block and macroblock structure of the picture is visible.

A blockiness measurement is a quantification of the blockiness of the decompressed video image. The blockiness measurement can be used to determine the quality of the compressed video signal since blockiness is a severe compression artifact. The blockiness artifact is especially apparent at low bit rates and when the compressed signal has been corrupted. At low video bit rates over-compression would cause visible block transitions in smooth textual areas, such as sky, grass, or the shade of a wall. At low or high video bit rates, corruption of a compressed signal would cause visible foreign blocks in the picture.

Ideally the amount of compression is maximized while still providing a video image or picture that is free of artifacts such as blockiness. Accordingly there is a need for a real-time blockiness detection system which can be used to decrease the level of compression if the blockiness reaches a certain threshold or increase the level of compression if the blockiness falls below a certain threshold.

SUMMARY

Certain embodiments relate to a method of measuring the blockiness of a video signal comprised of a plurality of pixels, the method comprising the steps of: calculating a total number of pixels in flat blocks and a total number of pixels in visible block edge transitions in the video signal; and generating at least one blockiness indicator from the total number of pixels in flat blocks and the total number of pixels in visible block edge transitions.

The method may also include the step of selecting a region of interest from the video signal prior to calculating and generating.

The step of calculating the total number of pixels in flat blocks areas and the total number of pixels in visible block edge transitions may include for each pixel in the video signal: calculating differential values for the pixel; and analyzing the differential values to determine if the pixel is part of a transition and if the pixel is part of a flat area; and counting the number of pixels in flat blocks and the number of pixels in visible block edge transitions to produce a total number of pixels in flat blocks and a total number of pixels in visible block edge transitions.

Other embodiments relate to a video signal compression system comprising a video source for producing a video signal comprised of a plurality of pixels; a compression module for compressing the video signal at a compression level into a compressed video signal; a decompression module for decompressing the compressed video signal into a decompressed video signal; and a blockiness detection module configured to: calculate a total number of pixels in flat blocks and a total number of pixels in visible block edge transitions in the decompressed video signal, and generate at least one blockiness indicator from the total number of pixels in flat blocks and the total number of pixels in visible block edge transitions wherein the compression module adjusts the compression level based on the at least one blockiness indicator.

BRIEF DESCRIPTION OF THE DRAWINGS

For a better understanding of the embodiments and to show more clearly how they may be carried into effect, reference will now be made, by way of example only, to the accompanying drawings, in which.

DETAILED DESCRIPTION OF THE EMBODIMENTS

Figure 1:
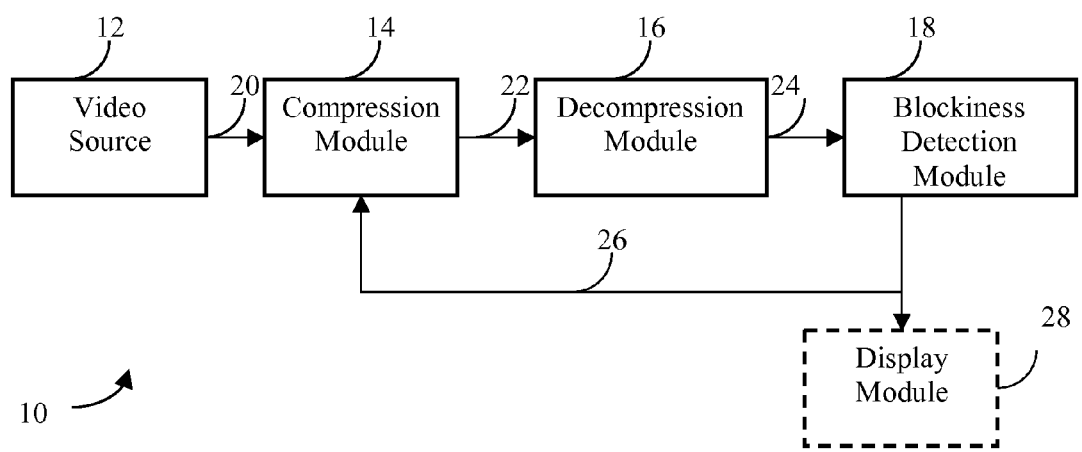
FIG. 1 is a general block diagram of a blockiness detection system in accordance with an embodiment.

Referring now to FIG. 1, shown therein is a block diagram of a blockiness detection system 10 including a video source 12, a compression module 14, a decompression module 16, a blockiness detection module 18 and an optional display module 28. The video source 12 produces a video signal 20. Compression module 14 compresses the video signal 20 using any known compression standard such as H.261, H.263, MPEG-1, MPEG-2, and MPEG-4 and outputs a compressed video signal 22. Decompression module 16 decompresses the compressed video signal 22 and outputs a decompressed video signal 24. The blockiness detection module 18 analyzes the decompressed video signal 24 and generates a decompressed video signal blockiness indicator 26. Details regarding the method for generating a video signal blockiness indicator are provided below in reference to FIG. 2.

The decompressed video signal blockiness indicator 26 produced by the blockiness detection module 18 is transmitted to the compression module 14 where it may be used to adjust the level of compression. For example, if the decompressed video signal blockiness indicator 26 is above a certain threshold the compression module 14 may decrease the level of compression. Similarly, if the decompressed video signal blockiness indicator 26 is below a certain threshold the compression module 14 may increase the level of compression. The decompressed video signal blockiness indicator 26 may also be outputted to a display module 28 for display to a user/operator.

Figure 2:
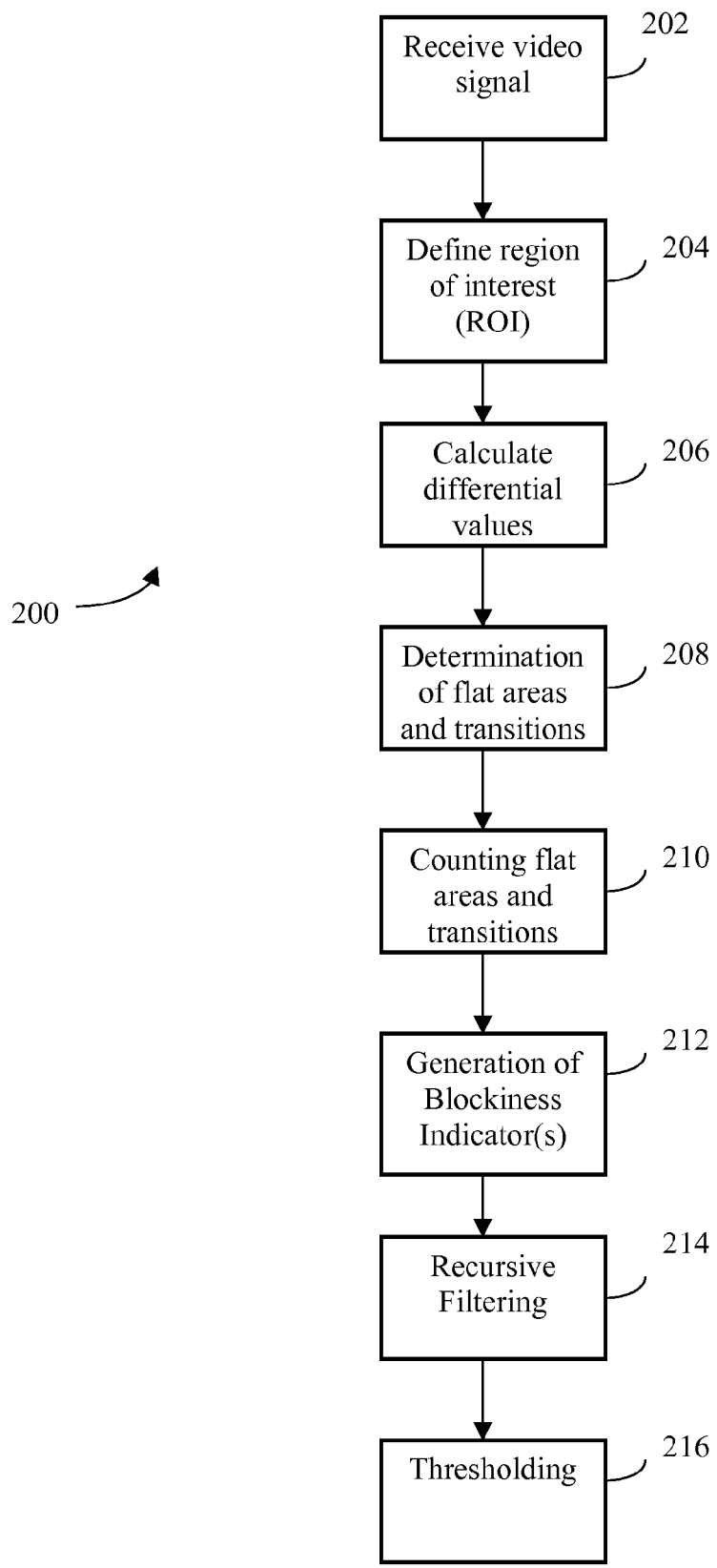
FIG. 2 is a method for detecting the blockiness of a video signal in accordance with an embodiment.
Figure 3:
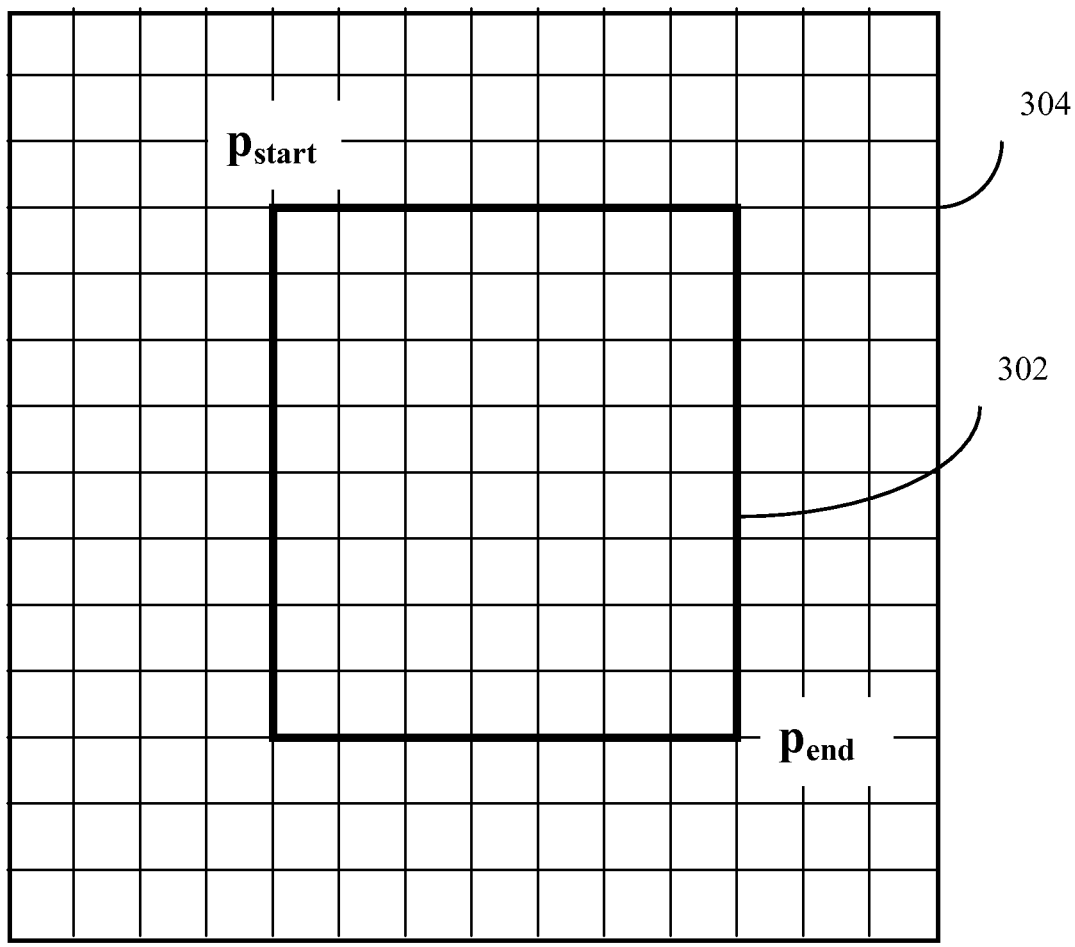
FIG. 3 is a region of interest in accordance with an embodiment.

Referring now to FIG. 2, shown therein is a method 200 for determining the blockiness of a video signal in accordance with an embodiment. In step 202 a video signal comprised of pixels is received by a blockiness detection module. The video signal may be an original video signal or a decompressed video signal. In step 204 a region of interest (ROI) is selected from the video signal and it is this ROI on which the blockiness detection is performed. The ROI is defined by two points: $p_{stat}$ and $p_{end}$. The first point, $p_{start}$, represents the upper left corner of the ROI and is defined by x and y coordinates $x_{start}$ and $y_{start}$. The second point, $p_{end}$, represents the bottom right corner of the ROI and is defined by x and y coordinates $x_{end}$ and $y_{end}$. Referring now to FIG. 3, shown therein is a region of interest 302 selected from a video signal 304.

The ROI can be pre-selected or a user can manually select it. If no ROI is pre-selected or manually selected then the ROI is defined to be the active viewing area. Note that the active viewing area does not include the part of the image that is outside the normal rectangular viewing area on a display screen. One of the advantages to manually selecting an ROI is that the user may exclude certain areas from being falsely detected as blocky.

In step 206 of method 200, x and y differential values are calculated for each pixel in the video signal. To compute the differential values for a pixel of interest, the pixel of interest and the $n^2-1$ pixels in the ROI immediately surrounding the pixel of interest are selected to form an n×n filter kernel, where n is any odd integer greater than one. If, however, the pixel of interest is on the edge of the ROI such that there are not $n^2-1$ pixels in the ROI immediately surrounding the pixel of interest then the n×n filter kernel can be formed in a variety of ways. For example, if the ROI is smaller than the video signal then the pixels outside the ROI can be used to fill the n×n filter kernel. Alternatively the pixel itself can be duplicated in the empty spots in the filter kernel. In an exemplary embodiment n is equal to 3 such that a 3×3 filter kernel is selected.

An NTSC, PAL or SECAM video signal contains two parts that make up what you see on the display: the intensity part, and the color part. chroma is the color part and luma is the intensity or brightness part. More specifically, luma represents the achromatic image without any color, while the chroma components represent the color information. A blockiness indicator may be based on both the luma and chroma components, however, a blockiness indicator based solely on the luma components provides a good indication of blockiness. Accordingly, to simplify the description of the blockiness indicator algorithm the remainder of the description will be described in reference to only the luma values.

Figure 4:
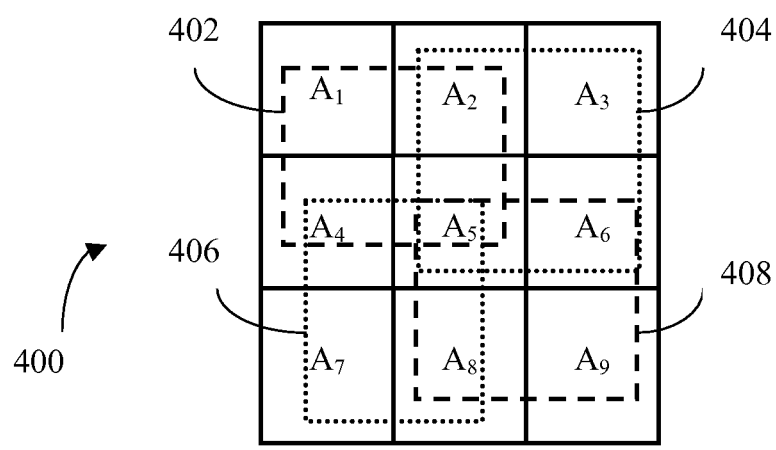
FIG. 4 is a 3×3 luma filter kernel in accordance with an embodiment.

Referring now to FIG. 4, shown therein is a 3×3 luma filter kernel 400 where $A_5$ represents the pixel of interest. The luma filter kernel 400 is represented by nine luma values. $A_1$, $A_2$, $A_3$, $A_4$, $A_5$, $A_6$, $A_7$, $A_8$ and $A_9$. Luma values $A_1$, $A_2$ and $A_3$ represent the first row of values from left to right, luma values $A_4$, $A_5$ and $A_6$ represent the second row of values from left to right and luma values $A_7$, $A_8$ and $A_9$ represent the third row of luma values from left to right. In one embodiment the luma values will be truncated to 8-bits to reduce space requirements. When the luma values are truncated to 8-bits the luma values may range from 0 for black to 255 for white. In an alternative embodiment the luma values may range from 16 for black to 235 for white.

X and Y differential values are computed for each 2×2 sub-block in the luma filter kernel 400. As shown in FIG. 4 there are four 2×2 sub-blocks of a 3×3 luma filer kernel 400: sub-block$_1$ 402, sub-block$_2$ 404, sub-block$_3$ 406 and sub-block$_4$ 408. Sub-block$_1$ 402 is comprised of luma values $A_1$, $A_2$, $A_4$ and $A_5$. Sub-block$_2$ 404 is comprised of luma values $A_2$, $A_3$, $A_5$ and $A_6$. Sub-block$_3$ 406 is comprised of luma values $A_4$, $A_5$, $A_7$ and $A_8$. Sub-block$_4$ 408 is comprised of luma values $A_5$, $A_6$, $A_8$ and $A_9$.

The x differential value, represented by lx, is equal to the absolute value of the upper right luma value minus the upper left luma value plus the lower right luma value minus the lower left luma value, all divided by two. For example, for sub-block$_1$ 402 consisting of luma values $A_1$, $A_2$, $A_4$ and $A_5$, the x differential value is equal to the absolute value of $((A_2-A_1)+(A_5-A_4))$ divided by 2. The x differential value, $lx_i$, for the $i^{th}$ sub-block can be represented by the following equations:

$$lx_1 = \text{absolute}((A_2-A_1)+(A_5-A_4))/2$$

$$lx_2 = \text{absolute}((A_3-A_2)+(A_6-A_5))/2$$

$$lx_3 = \text{absolute}((A_5-A_4)+(A_8-A_7))/2$$

$$lx_4 = \text{absolute}((A_6-A_5)+(A_9-A_8))/2$$

The y differential value, represented by ly, is equal to the absolute value of the lower left luma value minus the upper left luma value plus the lower right luma value minus the upper right luma value, all divided by two. For example, for sub-block$_1$ 402 consisting of luma values $A_1$, $A_2$, $A_4$ and $A_5$, the y differential value is equal to the absolute value of $((A_4-A_1)+(A_5-A_2))$ divided by 2. The y differential value, $ly_i$, for the $i^{th}$ sub-block can be represented by the following equations:

$$ly_1 = \text{absolute}((A_4-A_1)+(A_5-A_2))/2$$

$$ly_2 = \text{absolute}((A_5-A_2)+(A_6-A_3))/2$$

$$ly_3 = \text{absolute}((A_7-A_4)+(A_8-A_5))/2$$

$$ly_4 = \text{absolute}((A_8-A_5)+(A_9-A_6))/2$$

In step 208 of method 200, qualifier calculations are performed to determine whether the pixel of interest lies on a horizontal edge in which a visible transition occurs (Qh), whether the pixel of interest lies on a vertical edge in which a visible transition occur (Qv), and/or whether the pixel is part of a flat area (Qf). Horizontal/vertical transitions and flat blocks are key indicators of a blockiness problem. This is because horizontal and vertical transitions increase as the video quality goes from good to poor. However, horizontal and vertical transitions cannot be relied upon as the sole indicator of blockiness since when the video quality decreases from poor to very poor, the transitions may actually decrease because the blocky blocks may join together. With respect to flat areas, this is also a good blockiness indicator since video with severe blockiness tends to have blocks with flat areas.

Boolean value Qh indicates whether the pixel of interest lies on a horizontal edge in which a visible transition occurs. In one exemplary embodiment the horizontal edge of interest is the one between the first row and the second row of pixels, but one skilled in the art would be able to modify the algorithms so that the horizontal edge of interest is the one between the second row and the third row of pixels. In this exemplary embodiment the pixel of interest is said to lie on a horizontal edge in which a visible transition occurs if the differential between the first row of luma values and the second row of luma values meets a minimum edge threshold (Te) and the differential between all other rows and columns does not reach a maximum non-edge threshold (Tne). Te represents the minimum differential in luma values that is visible to the naked eye. In one embodiment Te is equal to 4.

In other embodiments Te ranges from 2 to 15. In one embodiment Tne is equal to 1. In other embodiments Tne ranges from 1 to 7.

Generally a pixel is said to lie on a horizontal edge in which a visible transition occurs if the x and y differential values for each sub-block are above or below Te and Tne. Qh, in general form, can be represented by the following Boolean expression:

$$Qh = (Sbh_1 \text{ AND } Sbh_2) \text{ AND } (Sbh_3 \text{ OR } Sbh_4)$$

where Boolean value $Sbh_i$ represents the horizontal transition test for sub-block$_i$. The specific tests for each sub-block can be represented by the following Boolean expressions:

$$Sbh_1 = (lx_1 <= Tne) \text{ AND } (ly_1 >= Te)$$

$$Sbh_2 = (lx_2 <= Tne) \text{ AND } (ly_2 >= Te)$$

$$Sbh_3 = (lx_3 <= Tne) \text{ AND } (ly_3 >= Te)$$

$$Sbh_4 = (lx_4 <= Tne) \text{ AND } (ly_3 >= Te)$$

Boolean value Qv indicates whether the pixel of interest lies on a vertical edge in which a visible transition occurs. In one exemplary embodiment the vertical edge of interest is the one between the first column and the second column of pixels, but one skilled in the art would be able to modify the algorithms so that the vertical edge of interest is the one between the second column and the third column of pixels. In this exemplary embodiment the pixel of interest is said to lie on a vertical edge in which a visible transition occurs if the differential between the first column of luma values and the second column of luma values meets a minimum edge threshold (Te) and the differential between all other rows and columns does not reach a maximum non-edge threshold (Tne). Generally a pixel of interest lies on a vertical edge in which visible transition occurs if the x and y differential values for each sub-block meet certain thresholds or are below certain thresholds. Qv, in general form, can be represented by the following Boolean expression:

$$Qv = (Sbv_1 \text{ AND } Sbv_3) \text{ AND } (Sbv_2 \text{ OR } Sbv_4)$$

where the Boolean value $Sbv_i$ represents the vertical transition test for sub-block$_i$. The specific tests for each sub-block can be represented by the following Boolean expressions:

$$Sbv_1 = (ly_1 <= Tne) \text{ AND } (lx_1 >= Te)$$

$$Sbv_2 = (ly_2 <= Tne) \text{ AND } (lx_2 >= Te)$$

$$Sbv_3 = (ly_3 <= Tne) \text{ AND } (lx_3 >= Te)$$

$$Sbv_4 = (ly_4 <= Tne) \text{ AND } (lx_3 >= Te)$$

The Boolean value Qf indicates whether the pixel of interest is part of a flat area. A fat area can be described as one in which all of the luma values in luma filter kernel 400 are the same. Accordingly, a pixel lies in a flat area if all x and y differential values are equal to zero. Qf can be represented by the following Boolean expression:

$$Qf = ((ly_1=0) \text{ AND } (lx_1=0)) \text{ AND } ((ly_2=0) \text{ AND } (lx_2=0)) \text{ AND } ((ly_3=0) \text{ AND } (lx_3=0)) \text{ AND } ((ly_4=0) \text{ AND } (lx_4=0))$$

In step 210 of method 200, the horizontal border transitions count (bh), the vertical border transitions count (bv), the flat area count (bf) and the macroblock flat area count (bc) for the ROI are calculated. Step 210 may be performed in hardware by, for example, a field programmable gate array (FPGA) or in software.

The horizontal border transitions count (bh) represents the total number of pixels of the ROI that are part of a visible horizontal transition along a block border. Since DCT codes a video signal in 8×8 block, a visible horizontal transition along a block border is a horizontal transition that lasts a block (8 pixels) or multiple blocks (n*8 pixels). Accordingly, a transition that only lasts 5 pixels will not be considered a visible horizontal transition along a block border. In one embodiment the horizontal border transitions count (bh) is calculated by horizontally counting the number of valid horizontal transitions (Qh) in a row and if the count plus 2 is divisible by 8 then the horizontal border count (bh) is increased by the number of valid horizontal transitions plus 2. With respect to the 'plus 2' aspect of the calculation, a pixel of interest is only said to be on a valid horizontal transition if there is a valid differential between (1) the pixel of interest and the one above it, (2) the pixel to the left of the pixel of interest and the one above that one, and (3) the pixel to the right of the pixel of interest and the pixel above that one. Accordingly the pixels on the end of a horizontal transition will not quality as being on a visible horizontal transition along a block border because either the pixels to the left or the right will not meet the test. Therefore the 'plus 2' is required to get an accurate count of pixels in horizontal border transitions.

Similarly, the vertical border transitions count (bv) represents the total number of pixels of the ROI that are part of a visible vertical transition along a block border. In one embodiment the number of vertical border transitions count (bv) is calculated by vertically counting the number of valid vertical transitions (Qv) in a row and if the count plus 2 is divisible by 8 then the vertical border count (bv) is increased by the number of valid horizontal transitions plus 2. The reason for the 'plus 2' is described above in relation to the horizontal block transition count (bh). In an alternative embodiment, the vertical border transitions count (bv) is calculated by counting the number of horizontal pixels that are between two pixels on vertical transitions (Qv), and if the number plus 1 is divisible by 8, then the vertical border transitions count (bv) is increased by 1. This alternative embodiment would be used when the counting is done in hardware that reads in the pixels on a row basis instead of a column basis, and it would be too costly to transpose the image in hardware.

The flat area count (ba) represents the total number of pixels in the ROI that are in a flat area. This is simply calculated by adding up the number of Qfs in the ROI.

The macroblock flat area count (bc) represents the total number of pixels in the ROI that are in a flat macroblock. A flat macroblock is a flat area constituting one or more 8×8 blocks. In one embodiment the number of macroblock flat areas is calculated by horizontally counting the number of pixels in flat areas (Qf in a row and if the count plus 2 is divisible by 8 then the macroblock flat areas count is increased by the count plus 2. The reason for the 'plus 2' is described above in relation to the horizontal block transition count (bh).

Pseudo-code describing the process of calculating the horizontal border transitions count (bh), the vertical border transitions count (bv), flat areas count (bf), and the macroblock flat areas count (bc), is shown below:

```
Counting transitions and flat areas

V = yend − ystart + 1;
H = xend − xstart + 1;
bh = 0;
```

-continued

| Counting transitions and flat areas |
|---|
| ```
bv = 0;
bf = 0;
bc = 0;
for y=ystart:yend
    cnth = 0;
    cntv = 0;
    cntc = 0;
    for x=xstart:xend
        if qh(x,y)
            cnth = cnth + 1;
        else
            t = cnth + 2;
            if mod (t, 8) == 0
                bh = bh +1
            end
            cnth = 0;
        end
        if ~qv(x,y)
            cntv = cntv + 1;
        else
            if mod (cntv + 1, 8)
                bv = bv + 1;
            end
            cntv = 0;
        end
        if qf(x,y)
            bf = bf +1;
        end
        if qf(x,y)
            cntc = cntc + 1;
        else
            t = cntc + 2;
            if mod (t, 8) == 0
                bc = bc + t;
            end
            cntc = 0;
        end
    end
end
``` |

In step 212 of method 200, at least one blockiness indicator is generated. A blockiness indicator is a numerical value that indicates the level of blockiness in the video signal. In one embodiment three blockiness indicators are generated: a block border indicator (bbi), a flat area indicator (fai) and a flat block indicator (fbi). The block border indicator (bbi) is equal to the number of pixels along visible macroblock borders multiplied by 10 and then divided by the total number of pixels in the ROI. The number of pixels along visible macroblock borders is multiplied by 10 to bring the block border indicator (bbi) on a comparable scale as the flat area indicator (fai) and a flat block indicator (fbi). There is required because bbi is a measurement of borders whereas fai and fbi are measurements of areas so naturally fai and fbi will be significantly larger than bbi.

The number of pixels along visible macroblock borders is equal to the horizontal border transitions count (bh) plus the vertical border transitions count (bv) calculated in step 210. The total number of pixels in the ROI (N) is equal to the width of the ROI multiplied by the height of the ROI. N can be represented by the following formula:

$$N=(x_{end}-x_{start}+1)*(y_{end}-Y_{start}+1)$$

The block border indicator (bbi) can be thus represented by the following formula:

$$bbi=10*(bh+bv)/N$$

The block border indicator (bbi) provides a direct correlation to the blockiness of an image. For example, a bbi>0.1 indicates a high level of blockiness. For most clean pictures bbi is close to 0. The flat area indicator (fai) is equal to the total number of pixels in flat areas (bf) divided by the total pixels in the ROI. The flat area indicator (fai) can be represented by the following formula:

$$fai=bf/N$$

The flat area indicator (fai) is useful in distinguishing graphics from video. For example, a fai>0.6 indicates the image is likely graphics, not video.

The flat block indicator (fbi) is equal to the number of pixels in flat macroblocks (bc) divided by the total pixels in the ROI. The flat block indicator (fbi) can be represented by the following formula:

$$fbi=bc/N$$

The flat block indicator (fbi) is useful in detecting picture breakup. For example, if fbi>0.1 then the video is likely corrupted.

In step 214 of method 200, recursive filtering is performed on the blockiness indicator(s). Step 214 may be performed by software residing on a central processing unit (CPU). The output of the filter, blockiness(n), is equal to the difference between the current blockiness indicator and the previous filter output multiplied by a factor, k, plus the previous filter output. The filter output, blockiness(n) can be represented by the following formula:

$$blockiness(n)=(blockiness\_indicator-blockiness(n-1))*k+blockiness(n-1)$$

Factor k is equal to a user determined value, Kuser, when the difference between the blockiness indicator and the previous filter output (blockiness(n−1)) is less than an adjustable threshold, Tchange, otherwise k is equal to zero. Kuser is the value that determines how smooth the filter output is. The larger Kuser is the more the filter output is affected by changes in the blockiness indicator. Conversely, the smaller Kuser is, the less the filter output is affected by changes in the blockiness indicator and the smoother it is. In one embodiment Kuser can be any value of $10^n$ where n is any 0.1 increment between −4 and 0.

Tchange is an adjustable value that controls whether large changes in the blockiness indicator are immediately reflected in the filter output. The larger Tchange is, the larger the difference between the blockiness indicator and the previous filter output (blockiness(n−1)) has to be before it will be ignored by the filter.

The recursive filtering of step 214 may be performed on any or all of the blockiness indicators such as the block border indicator (bbi), the flat area indicator (fai), and the flat block indicator (fbi). When the block border indicator (bbi) is filtered, the filtered output is referred to as bb. When the flat area indicator (fai) is filtered, the filtered output is referred to as fa. Similarly, when the flat block indicator (fbi) is filtered, the filtered output is referred to as fb. The recursive filtering may be performed by an IIR filter.

In step 216 of method 200, thresholding is performed on the filter outputs (i.e. bb, fa and fb) to determine if a macroblock alert should be produced. Step 216 may be performed by software residing on a central processing unit (CPU). A macroblock alert is produced if certain filter outputs reach a predetermined threshold. The specific filter outputs that would trigger an alert and the specific thresholds required to trigger an alert are configurable.

In one embodiment a macroblock alert is triggered when the bb, fa and fb outputs each reach a specific threshold. The threshold that relates to the bb output is referred to as Tbb. The threshold that relates to the fa output is referred to as Tfa. Similarly the threshold that relates to the fb output is referred to as Tfb. The macroblock alert output can be represented by the following Boolean expression.

macroblock alert=(bb>Tbb) AND (fa<Tfa) AND (fb>Tfb)

Figure 5:
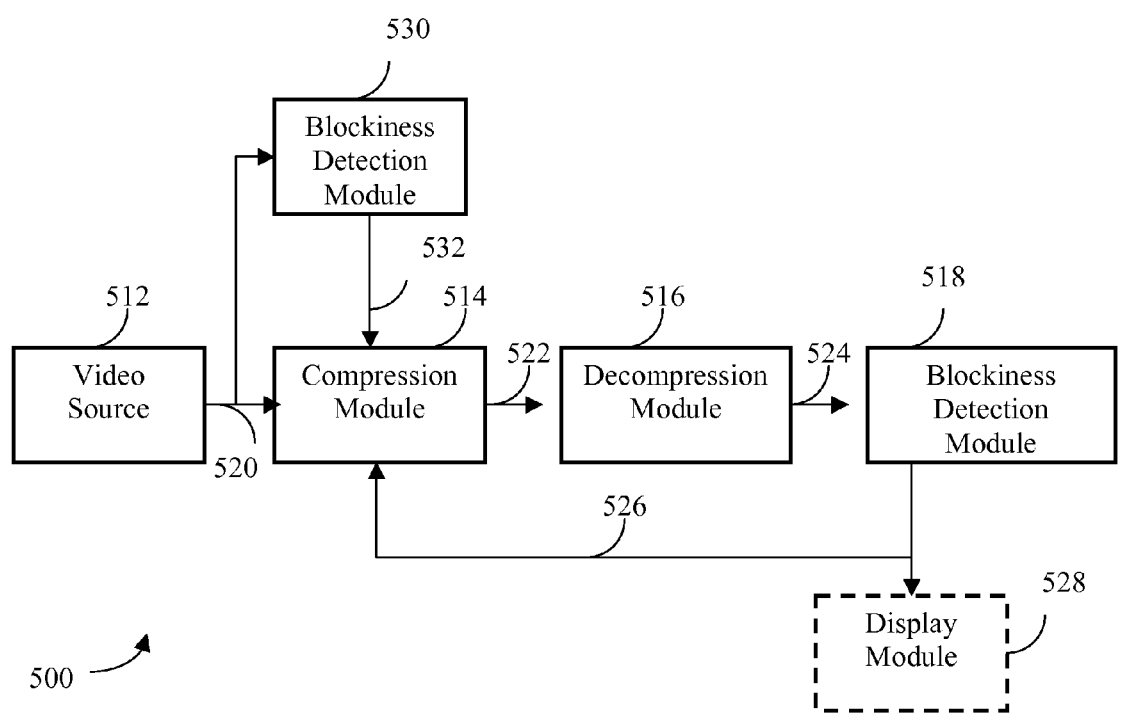
FIG. 5 is a general block diagram of a blockiness detection system in accordance with an alternative embodiment.

Referring now to FIG. 5, shown therein is a block diagram of an alternate embodiment of a blockiness detection system 500. The blockiness detection system 500 includes a video source 512, a compression module 514, a decompression module 516, a first blockiness detection module 518 and a second blockiness detection module 530. The video source 512 produces a video signal 520. Compression module 514 compresses the video signal 520 and outputs a compressed video signal 522. Decompression module 516 decompresses the compressed video signal 522 and outputs a decompressed video signal 524. The first blockiness detection module 518 analyzes the decompressed video signal 524 and generates a decompressed video signal blockiness indicator 526. The decompressed video signal blockiness indicator 526 is then transmitted to the compression module 514.

In parallel the second blockiness detection module 530 receives the video signal 520 generated by the video source 512 and generates a video signal blockiness indicator 532. The compression module 514 compares the video signal blockiness indicator 532 to the decompressed video signal blockiness indicator 526 and if the decompressed video signal blockiness indicator 526 is higher than the video signal blockiness indicator 532 by a predetermined amount then the compression is too high and the compression module 514 readjusts the compression.

While the above description provides examples of embodiments, it will be appreciated that some features and/or functions of the described embodiments are susceptible to modification and change without departing from the spirit and principles of operation of the described embodiments. Accordingly, what has been described and shown in the drawings is intended to be illustrative of the invention and the described embodiments, rather than being a limiting and/or exclusive definition.

The invention claimed is:

1. A method of detecting a blockiness of a video signal comprised of a plurality of pixels the method comprising the steps of:
   selecting a region of interest from the video signal;
   for each pixel in the region of interest,
      determining whether the pixel lies on a horizontal edge in which a visible transition occurs, a vertical edge in which a visible transition occurs, or in a flat area;
      if the pixel lies on the horizontal edge or the vertical edge in which the visible transitions occur or in the flat area, determining if the pixel is a part of a visible horizontal transition along a macroblock border, a visible vertical transition along a macroblock border, a flat area or a flat macroblock;
   calculating a total number of pixels in the region of interest by calculating a horizontal border transitions count, a vertical border transitions count, a flat area count and a macroblock flat area count, wherein:
      the horizontal border transitions count represents a total number of pixels of the region of interest that are a part of the visible horizontal transition along the macroblock border,
      the vertical border transitions count represents a total number of pixels of the region of interest that are a part of the visible vertical transition along the macroblock border,
      the flat area count represents a total number of pixels of the region of interest that are a part of the flat area, and
      the macroblock flat area count represents a total number of pixels of the region of interest that are a part of the flat macroblock; and
   generating at least one blockiness indicator for the region of interest selected from the group consisting of a block border indicator, a flat area indicator and a flat block indicator, wherein the at least one blockiness indicator is based on at least one of the horizontal border transitions count, the vertical border transitions count, the flat area count and the macroblock flat area count.

2. The method of claim 1, wherein determining whether the pixel lies on the horizontal edge in which a visible transition occurs, the vertical edge in which the visible transition occurs or in the flat area comprises:
   for each pixel in the region of interest,
      calculating differential values for the pixel; and
      analyzing the differential values to determine if the pixel lies on the horizontal edge in which the visible transition occurs, the vertical edge in which the visible transition occurs or in the flat area.

3. The method of claim 2 wherein calculating differential values includes selecting $n^2-1$ pixels surrounding the pixel in the region of interest wherein n is any odd integer greater than one.

4. The method of claim 3 wherein n is equal to three.

5. The method of claim 1 wherein the at least one blockiness indicator includes a block border indicator.

6. The method of claim 1 wherein the at least one blockiness indicator includes a flat area indicator.

7. The method of claim 1 wherein the at least one blockiness indicator includes a flat block indicator.

8. The method of claim 1 wherein three blockiness indicators are generated.

9. The method of claim 8 wherein the three blockiness indicators are a block border indicator, a flat area indicator and a flat block indicator.

10. The method of claim 1 wherein the calculation step is performed using luma values of the video signal.

11. The method of claim 1 further comprising:
   recursive filtering on the at least one blockiness indicator.

12. The method of claim 1 further comprising generating a blockiness alarm if the at least one blockiness indicator surpasses a configurable threshold.

13. The method of claim 1, wherein the total number of pixels in the region of interest is calculated by counting the number of pixels in the region of interest that lie on the horizontal and vertical transition along the macroblock border and in the flat macroblock.

14. A video signal compression system comprising:
   a video source for producing a video signal comprised of a plurality of pixels;
   a compression module for compressing the video signal at a compression level into a compressed video signal;
   a decompression module for decompressing the compressed video signal into a decompressed video signal; and
   a blockiness detection module configured to:
      select a region of interest from the decompressed video signal;
      for each pixel in the region of interest,
         determine whether the pixel lies on a horizontal edge in which a visible transition occurs, vertical edge in which a visible transition occurs or in a flat area; and if the pixel lies on the horizontal edge or the vertical edge in which the visible transitions occur or in the flat area, determine if the pixel is a part of a visible horizontal transition along a macroblock border, visible vertical transition along a macroblock border, a flat area or a flat macroblock;

calculate a total number of pixels in the region of interest by calculating a horizontal border transitions count, a vertical border transitions count, a flat area count and a macroblock flat area count, wherein:

the horizontal border transitions count represents a total number of pixels of the region of interest that are a part of the visible horizontal transition along the macroblock border, the vertical border transitions count represents a total number of pixels of the region of interest that are a part of the visible vertical transition along the macroblock border, the flat area count represents a total number of pixels of the region of interest that are a part of the flat area, and the macroblock flat area count represents a total number of pixels of the region of interest that are a part of the flat macroblock; and generate at least one blockiness indicator for the region of interest selected from the group consisting of a block border indicator, a flat area indicator and a flat block indicator, wherein the at least one blockiness indicator is based on at least one of the horizontal border transitions count, the vertical border transitions count, the flat area count and the macroblock flat area count, wherein the compression module adjusts the compression level based on the at least one blockiness indicator.

15. The system of claim 14 wherein the blockiness detection module is further configured to:

for each pixel in the region of interest
calculate differential values for the pixel; and
analyze the differential values to determine if the pixel lies on the horizontal or vertical edge in which the visible transition occurs or in the flat area.

16. The system of claim 15 wherein calculating differential values includes selecting n^2−1 pixels surrounding the pixel in the region of interest wherein n is any odd integer greater than one.

17. The system of claim 16 wherein n is equal to three.

18. The system of claim 14 wherein the blockiness detection module is configured to calculate the total number of pixels using luma values of the decompressed video signal.

19. The system of claim 14 wherein the blockiness detection module is further configured to perform recursive filtering on the at least one blockiness indicator.

20. The system of claim 14 further comprising a display module for displaying the blockiness indicator.

21. The system of claim 14 wherein the blockiness detection module is configured to generate a blockiness alarm if the at least one blockiness indicator surpasses a configurable threshold.

22. A video signal compression system comprising:
a video source for producing a video signal comprised of a plurality of pixels;
a compression module for compressing the video signal at a compression level into a compressed video signal;
a decompression module for decompressing the compressed video signal into a decompressed video signal;
a first blockiness detection module configured to:
select a region of interest from the decompressed video signal;

for each pixel in the region of interest from the decompressed video signal,
determine whether the pixel lies on a horizontal edge in which a visible transition occurs, a vertical edge in which a visible transition occurs or in a flat area; and
if the pixel lies on the horizontal edge or the vertical edge in which the visible transitions occur or in the flat area, determine if the pixel is a part of a visible horizontal transition along a macroblock border, a visible vertical transition along a macroblock border, a flat area or a flat macroblock;

calculate a total number of pixels of the region of interest selected from the decompressed video signal by calculating a horizontal border transitions count, a vertical border transitions count, a flat area count and a macroblock flat area count, wherein:

the horizontal border transitions count represents a total number of pixels of the region of interest that are a part of the visible horizontal transition along the macroblock border, the vertical border transitions count represents a total number of pixels of the region of interest that are a part of the visible vertical transition along the macroblock border, the flat area count represents a total number of pixels of the region of interest that are a part of the flat area, and the macroblock flat area count represents a total number of pixels of the region of interest that are a part of the flat macroblock; and generate at least one blockiness indicator for the region of interest selected from the decompressed video signal selected from the group consisting of a block border indicator, a flat area indicator and a flat block indicator, wherein the at least one blockiness indicator is based on at least one of the horizontal border transitions count, the vertical border transitions count, the flat area count and the macroblock flat area count; and a second blockiness detection module configured to:
select a region of interest from the video signal;
for each pixel in the region of interest selected from the video signal,
determine whether the pixel lies on a horizontal edge in which a visible transition occurs, a vertical edge in which a visible transition occurs or in a flat area; and
if the pixel lies on the horizontal edge or vertical edge in which the visible transitions occur or in the flat area, determine if the pixel is a part of a visible horizontal transition along a macroblock border, a visible vertical transition along a macroblock border, a flat area or a flat macroblock;

calculate a total number of pixels of the region of interest selected from the video signal by calculating a horizontal border transitions count, a vertical border transitions count, a flat area count and a macroblock flat area count, wherein:

the horizontal border transitions count represents a total number of pixels of the region of interest that are a part of the visible horizontal transition along the macroblock border, the vertical border transitions count represents a total number of pixels of the region of interest that are a part of the visible vertical transition along the macroblock border, the flat area count represents a total number of pixels of the region of interest that are a part of the flat area, and the macroblock flat area count represents a total number of pixels of the region of interest that are a part of the flat macroblock; and generate at least one blockiness indicator for the region of interest selected from the video signal selected from the group consisting of a block border indicator, a flat area indicator and a flat block indicator, wherein the at least one blockiness indicator is based on at least one of the horizontal border transitions count, the vertical border transitions count, the flat area count and the macroblock flat area count, wherein the compression module adjusts the compression level based on the at least one blockiness indicator for the region of interest selected from the decompressed video signal and the at least one blockiness indicator for the region of interest selected from the video signal.

23. The system of claim 14, wherein the blockiness detection module is configured to count the number of pixels in the region of interest that lie on the horizontal and vertical transition along the macroblock border and in the flat macroblock to calculate the total number of pixels in the region of interest.

* * * * *